(12) United States Patent
Winkler et al.

(10) Patent No.: US 7,761,194 B2
(45) Date of Patent: Jul. 20, 2010

(54) METHOD AND DEVICE FOR ASSISTING A PILOT OF A FOLLOWER AIRCRAFT DURING A PATROL FLIGHT

(75) Inventors: Falk Winkler, Cintegabelle (FR); Guillaume Fouet, Toulouse (FR); Didier Menras, Toulouse (FR)

(73) Assignee: Airbus France, Toulouse (FR)

( * ) Notice: Subject to any disclaimer, the term of this patent is extended or adjusted under 35 U.S.C. 154(b) by 755 days.

(21) Appl. No.: 11/677,726

(22) Filed: Feb. 22, 2007

(65) Prior Publication Data

US 2008/0065279 A1  Mar. 13, 2008

(30) Foreign Application Priority Data

Feb. 28, 2006  (FR) .................................. 06 01711

(51) Int. Cl.
*B64C 25/27* (2006.01)
*G06F 19/00* (2006.01)
(52) U.S. Cl. .............................. 701/3; 701/11; 701/205; 340/963; 244/175

(58) Field of Classification Search .................... 701/3, 701/7, 8, 10, 11, 205, 210, 211, 300; 244/175; 340/963, 961, 964
See application file for complete search history.

(56) References Cited

U.S. PATENT DOCUMENTS

| 4,377,848 | A | 3/1983 | Flannigan et al. |
| 6,405,107 | B1 * | 6/2002 | Derman .......................... 701/3 |
| 6,946,976 | B1 * | 9/2005 | Langner et al. ............. 340/971 |
| 7,295,134 | B2 * | 11/2007 | Jourdan et al. .............. 340/963 |
| 2005/0230563 | A1 | 10/2005 | Corcoran, III |

FOREIGN PATENT DOCUMENTS

EP  0455580  11/1994

OTHER PUBLICATIONS

Preliminary Search Report dated Oct. 20, 2006.
* cited by examiner

*Primary Examiner*—Tan Q Nguyen
(74) *Attorney, Agent, or Firm*—Dickinson Wright PLLC

(57) ABSTRACT

A method and device that assist a pilot of a follower aircraft during a patrol flight, by presenting on a viewing screen an indicator that provides information as to the possibility of engagement of an automatic pilot during a patrol flight.

14 Claims, 3 Drawing Sheets

METHOD AND DEVICE FOR ASSISTING A PILOT OF A FOLLOWER AIRCRAFT DURING A PATROL FLIGHT

FIELD OF THE INVENTION

The present invention relates to a method and a device for assisting a pilot of a follower aircraft which is flying in patrol while following a lead aircraft and which comprises a standard system for aiding patrol flight comprising an automatic piloting means.

BACKGROUND OF THE RELATED ART

It is known that a patrol of aircraft, for example of fighters or military transporters, is composed of a lead aircraft, also called the leader, which is followed in flight according to a particular spacing (defined vertically, longitudinally and laterally) by one or more follower aircraft, also called wingmen. The relative flight between the lead aircraft and a follower aircraft may be performed:
  either simply (and exclusively) on the basis of the judgement of the pilot of the follower aircraft, as a function of his direct vision of the lead aircraft;
  or by way of a system of information and/or of piloting aid, such as an electronic system for aiding patrol flight comprising an automatic piloting means.

In this second case, the automatic piloting means automatically guides the follower aircraft in such a way as to maintain its prescribed position within the patrol. The engagement of such a means of automatic piloting of the follower aircraft is tied to the satisfaction of a plurality of engagement conditions which usually depend on the heading of the lead and follower aircraft and on the relative positions (lateral and longitudinal) between these lead and follower aircraft. Said automatic piloting means (of the electronic system for aiding patrol flight) can therefore be engaged only if the aforesaid engagement conditions are satisfied. If such is not the case, the pilot must bring the follower aircraft into a situation (relating for example to its speed and/or its heading) making it possible to satisfy said engagement conditions. However, the criteria used in these engagement conditions are not intuitively identifiable by the members of the crew and in particular by the pilot. So, to know whether he can engage the automatic piloting means at a current instant, the pilot of the follower aircraft must rely solely on his knowledge of these criteria and on their abstract visualization which is generally carried out on a standard display (of the system for aiding patrol flight). This greatly increases the work load of the pilot of the follower aircraft in this situation.

SUMMARY OF THE INVENTION

The object of the present invention is to remedy these drawbacks. It relates to a method for assisting a pilot of a follower aircraft (which is flying in patrol while following a lead aircraft and which comprises a system for aiding patrol flight comprising an automatic piloting means), which method is intended to inform the pilot of the follower aircraft as to a possibility of engagement of said automatic piloting means.

For this purpose, according to the invention, said method is noteworthy in that the following series of successive steps is carried out automatically and iteratively:
  a) at least one engagement criterion is devised, which pertains to at least one flight parameter, which depends on the performance of the follower aircraft, and which provides at least one span of admissible values of a quantity;
  b) the effective value of said flight parameter is determined on said follower aircraft;
  c) a comparison is carried out, comparing a quantity dependent on the effective value determined in step b) with said engagement criterion;
  d) on the basis of the result of this comparison and of said engagement criterion, at least one indicator is formed which pertains to said flight parameter and which provides an indication as to the compliance of said quantity with said engagement criterion, said indication giving information as to the possibility of engagement of said automatic piloting means and if appropriate as to the reason for an impossibility of engagement; and
  e) said indicator is presented, in graphical form, on at least one viewing screen of the follower aircraft.

Thus, by virtue of the invention, at least one indicator which provides information as to the possibility of engagement of the automatic piloting means is presented automatically to the pilot of the follower aircraft. Consequently, through the simple observation of said viewing screen, the pilot knows whether or not he can engage the automatic piloting means of the system for aiding patrol flight of his aircraft.

Moreover, as said indicator provides if appropriate information as to the reason for an impossibility of engagement, the pilot knows the reason or reasons which prevent engagement, and he can thus pilot the aircraft in such a way as to bring it into a situation for which this or these reasons disappear.

Preferably, the quantity used in step c) corresponds to the difference between the effective value (of said flight parameter) on the follower aircraft and the effective value (of this flight parameter) on the lead aircraft.

Furthermore, advantageously, in step a), said engagement criterion is obtained by downloading and/or by extraction from a database.

In a preferred embodiment, said indication as to the compliance is depicted on said indicator presented in graphical form by at least some of the following characteristics:
  variable colors;
  variable shapes; and
  variable sizes.

Thus, the pilot of the follower aircraft is provided with a graphical representation (illustrated by the indicator) which affords him a comprehensible and readable presentation of the conditions of engagement of the automatic piloting means.

Furthermore, advantageously, in step e), textual information indicating the reason for an impossibility of engagement of said automatic piloting means is presented on the viewing screen, if appropriate, for example in the form of a message of the type: "speed too high" or "speed too low".

Moreover, advantageously:
  the effective value of at least one auxiliary flight parameter of the follower aircraft is determined, having an influence on its performance; and
  in step a), an engagement criterion is devised, the value of which is dependent on this effective value.

Thus, by taking account of said auxiliary flight parameter, it is possible to hone the effective performance of the follower aircraft, and thus the engagement criteria which depend on this performance, thereby making it possible to increase the accuracy of the method in accordance with the invention.

In a first embodiment, said flight parameter is the speed, and said indicator corresponds to a speed vector able to comprise longitudinally at least two different colors, one illustrating a possibility of engagement of the automatic piloting means and the other an impossibility of engagement, the color present at the (free) end of this speed vector providing said indication as to compliance.

Furthermore, in a second embodiment, as a variant or as a supplement of the first aforesaid embodiment, said flight parameter is the heading, and said indicator comprises curves which form a cone of convergence indicating the limit heading values, and whose colors, which are variable, provide said indication as to compliance.

Of course, in a preferred embodiment, said successive steps a) to e) are implemented for a plurality of different engagement criteria, the automatic piloting means being engageable if all the indicators presented in step e) signal a compliance between the corresponding engagement criterion and the associated quantity.

The present invention also relates to a device for assisting a pilot of a follower aircraft which is flying in patrol while following a lead aircraft and which comprises a system for aiding patrol flight comprising an automatic piloting means, said device being intended to inform the pilot of the follower aircraft as to a possibility of engagement of said automatic piloting means.

According to the invention, said device is noteworthy in that it is mounted on said follower aircraft and comprises:
first means for devising at least one engagement criterion which pertains to at least one flight parameter, which depends on the performance of the follower aircraft, and which provides at least one span of admissible values of a quantity;
second means for determining, on said follower aircraft, the effective value of said flight parameter;
third means for carrying out a comparison, by comparing a quantity dependent on said effective value with said engagement criterion; and
display means:
so as to form, on the basis of the result of this comparison and of said engagement criterion, at least one indicator which pertains to said flight parameter and which provides an indication as to the compliance of said quantity with said engagement criterion, said indication giving information as to the possibility of engagement of said automatic piloting means and if appropriate as to the reason for an impossibility of engagement; and
so as to present said indicator, in graphical form, on at least one viewing screen.

In a particular embodiment, the device in accordance with the invention comprises, moreover, actuatable means for activating/deactivating said device.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
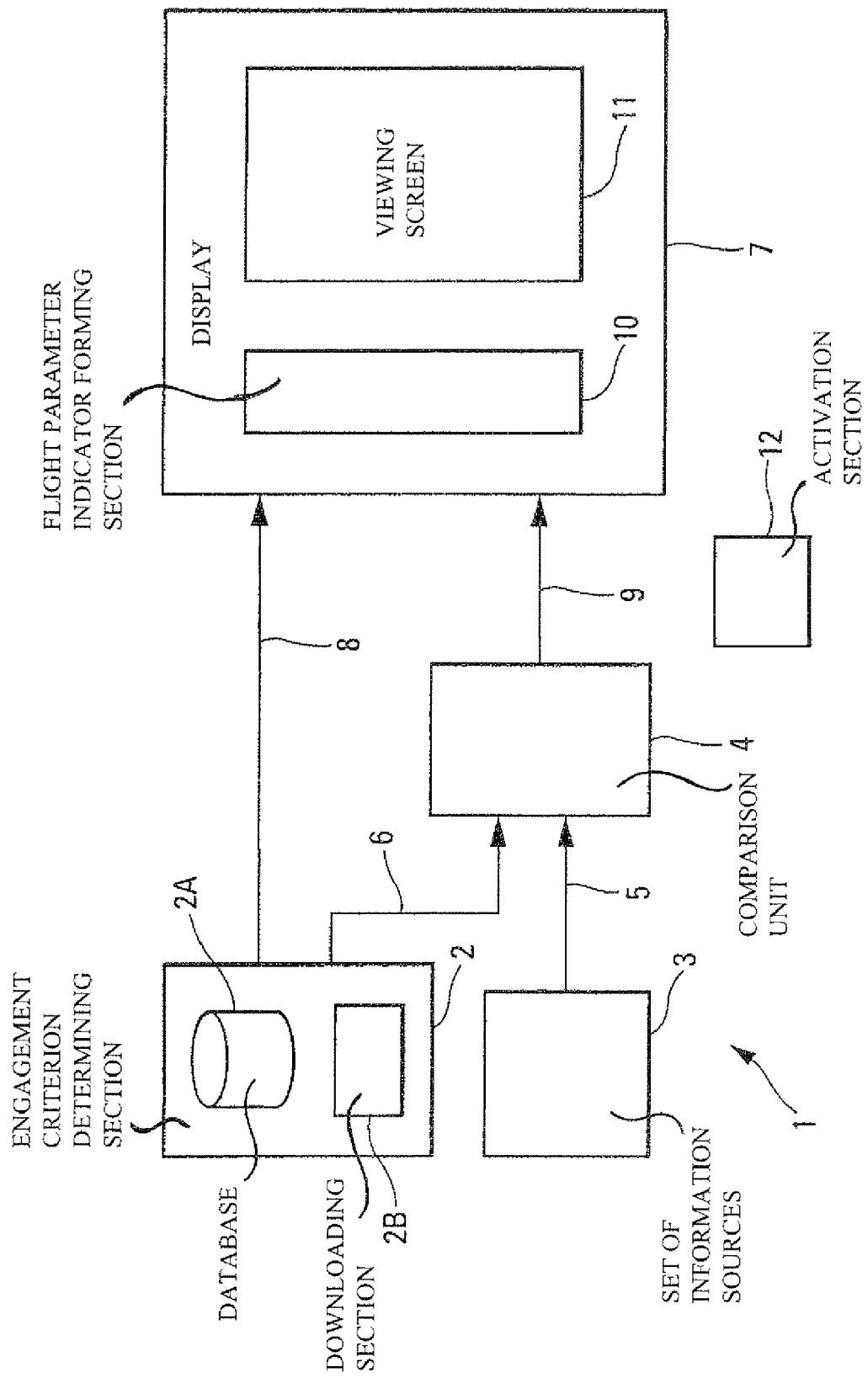
FIG. 1 is the schematic diagram of a device in accordance with the invention.

The device 1 in accordance with the invention and represented diagrammatically in FIG. 1 is intended to assist a pilot of a follower aircraft which is flying in patrol while following in standard fashion a lead aircraft and which comprises a standard system for aiding patrol flight comprising an automatic piloting means. The device 1 in accordance with the invention may correspond to an auxiliary device of this standard system for aiding patrol flight. More precisely, said device 1 is intended to inform the pilot of the follower aircraft as to the possibility (or the impossibility) of engaging, at the current instant, said automatic piloting means.

To do this, said device 1 of automatic type, which is mounted on said follower aircraft, comprises, according to the invention,
means 2 specified hereinbelow, for devising at least one engagement criterion:
which relates to at least one flight parameter, such as the speed, the heading or the position for example;
which depends on the performance of the follower aircraft; and
which provides, in standard fashion, at least one span of admissible values of at least one quantity specified hereinbelow;
a set 3 of information sources, which is able to determine, in standard fashion, on said follower aircraft, at least the effective value of said flight parameter. However, as specified hereinbelow, in a particular embodiment, said set 3 of information sources is capable of determining the effective values of a plurality of flight parameters (position, speed, heading, etc.) corresponding both to said follower aircraft and to said lead aircraft;
means 4, in particular a comparison unit, which comprises at least one means of comparison able to compare a quantity (which depends on the effective value determined by said set 3 and received by way of a link 5) with the corresponding engagement criterion (received from said means 2 by way of a link 6); and
display means 7 which are connected, respectively by way of links 8 and 9, to said means 2 and 4 and which comprise:
a means 10 for forming, on the basis of the result of the comparison or comparisons performed by said means 4 and of the engagement criterion or criteria received from said means 2, at least one indicator I1, I2 which pertains to said flight parameter and which provides an indication as to the compliance of the aforesaid quantity (and specified further below) with said engagement criterion. Said indication gives information as to the possibility of engagement of the automatic piloting means and, if appropriate, as to the reason for an impossibility of engagement; and
at least one viewing screen 11, on which said display means 7 presents said indicator I1, I2 in graphical form, as specified hereinbelow.

Thus, the device 1 in accordance with the invention automatically presents the pilot of the follower aircraft with at least one indicator I1, I2 which provides information as to the possibility of engagement of the automatic piloting means. Consequently, through simple observation of said viewing screen 11, the pilot knows whether or not he can engage the automatic piloting means of the system for aiding patrol flight of his aircraft.

Moreover, as said indicator I1, I2 provides, if appropriate, information as to the reason for an impossibility of engagement, the pilot knows the reason or reasons which prevent engagement, and he can thus pilot the aircraft in such a way as to bring it into a situation for which this or these reasons disappear.

Preferably, the aforesaid quantity used by said means 4 corresponds to the difference between the effective value (of said flight parameter) on the follower aircraft and the effective value (of this flight parameter) on the lead aircraft.

In a particular embodiment, said device 1 comprises, moreover, means 12 which are actuatable, for example in the form of an interactive physical check or by the actuation of a button on a control box, and which are formed in such a way as to activate or deactivate the device 1 in accordance with the invention.

Furthermore, in a particular embodiment, said means 2 comprise a database 2A which directly contains said engagement criteria. Furthermore, as a variant or as a supplement, said means 2 can comprise standard means of downloading 2B which are able to download said engagement criteria. The latter are of course known.

In a preferred embodiment, said indication as to the compliance is depicted on said indicator I1, I2 in graphical form, by at least some of the following characteristics,
   variable colors; and/or
   variable shapes; and/or
   variable sizes.

Thus, the device 1 provides the pilot of the follower aircraft with a graphical representation (in the form of an indicator I1, I2) which affords him an easily comprehensible and readable presentation of the conditions of engagement of the automatic piloting means, as specified hereinbelow.

Furthermore, said display means 7 may be formed in such a way as to present on the viewing screen 11, if appropriate, textual information indicating the reason for an impossibility of engagement of said automatic piloting means, for example in the form of a message of the type: "speed too high" or "speed too low".

Furthermore, in a particular embodiment, said means 2 are formed in such a way as to determine the effective value of at least one auxiliary flight parameter which has an influence on the performance of the follower aircraft (this value may in particular be received from said set 3), and to devise an engagement criterion, whose value is dependent on this effective value.

Thus, by taking account of said auxiliary flight parameter, said means 2 sharpen their knowledge of the effective performance of the follower aircraft, and may thus tailor the engagement criteria used which depend on this performance, thereby making it possible to increase the accuracy of the processing operations implemented by the device 1 in accordance with the invention.

In a first embodiment, said flight parameter represents the speed. In this case, said indicator I1 corresponds to a speed vector 13 able to comprise longitudinally at least two different colors, one (for example a green color) illustrating a possibility of engagement of the automatic piloting means and the other (for example a red color) illustrating an impossibility of engagement. The color present at the tip (or free end 13A) of this vector 13 provides said indication as to compliance.

Figure 2:
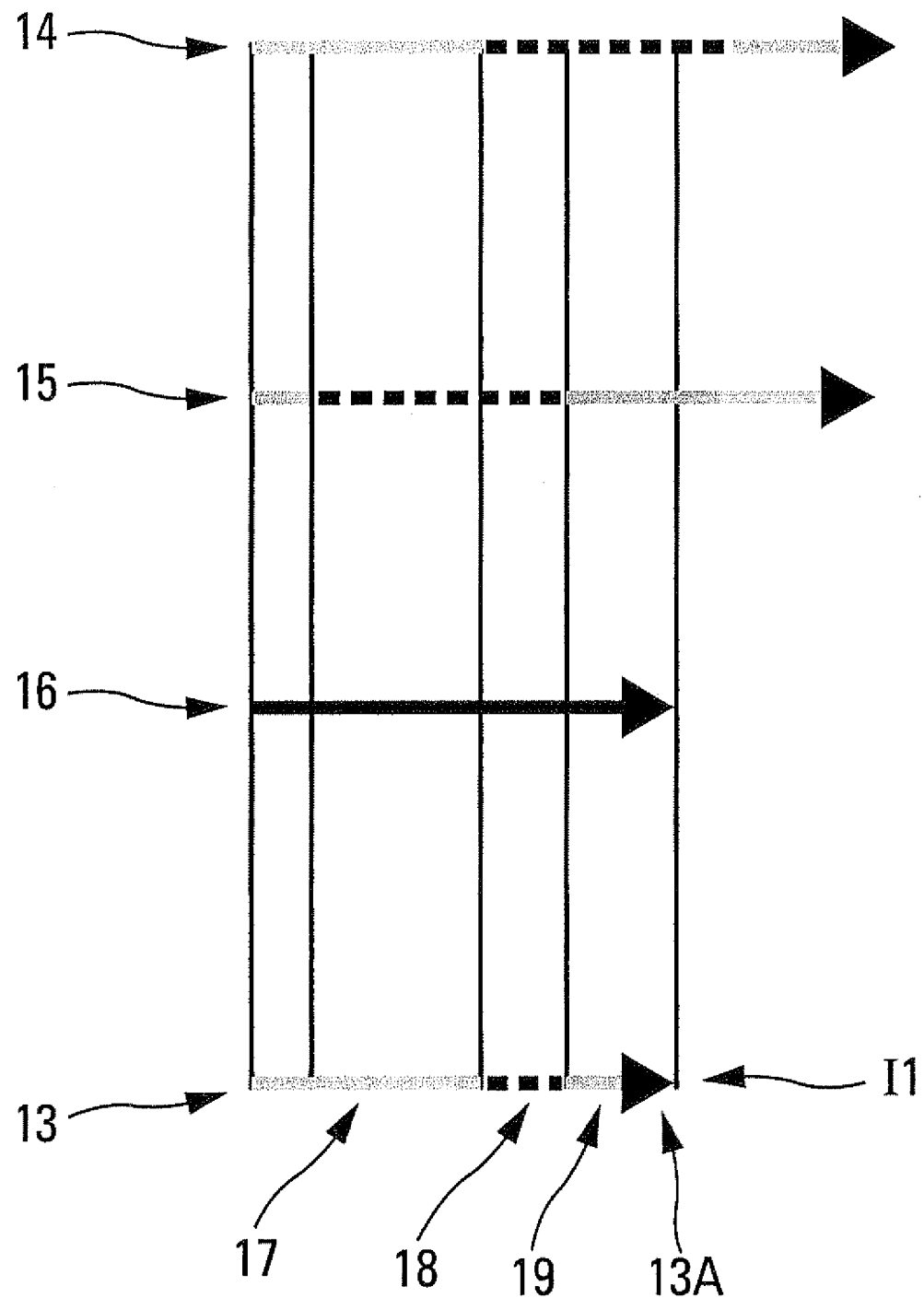
FIG. 2 is a graphic making it possible to explain the formation of a specific indicator, relating to a particular embodiment.

Represented in FIG. 2 is the embodiment of an indicator I1 relating to the speed. In this FIG. 2, a span of prohibited speeds of a speed vector is illustrated by a continuous gray line, and a span of permitted speeds is illustrated by broken black lines. This indicator I1, which is represented in the form of the speed vector 13, is obtained on the basis:
   of a vector 14 which illustrates the permitted (or prohibited) speed spans as a function of the performance of the follower aircraft. As the performance of the aircraft imposes a minimum speed, the start of this vector 14 therefore always comprises a span of prohibited speeds;
   of a vector 15 which illustrates the permitted (or prohibited) speed spans for the engagement of the automatic piloting means, that is to say it depicts the speeds which are compatible with an engagement of the automatic piloting means. This vector 15 takes into account the relative speed (or difference in speeds) between the lead and follower aircraft; and
   of a vector 16 in black, which corresponds to the current effective speed vector of the follower aircraft.

In this first embodiment, said display means 7 therefore use the information (vector 14) devised by the means 2, to determine the means of indication I1 and especially the characteristics (and in particular the color) of the first part 17 of the vector 13, since the performance imposes a minimum speed on the aircraft. Said means 7 then take into account the result of the comparison carried out by said means 4 to determine the length of the median part of the vector 15 making it possible to obtain the median part 18 of the vector 13, taking account of the speeds which are compatible with an engagement of the automatic piloting means. This median part 18 depends on the relative speed between the follower aircraft and the lead aircraft. Said display means 7 may optionally form a third part 19 which corresponds to a speed which is too high to permit engagement. The length of this third part 19 is formed by the vector 16.

Figure 3:
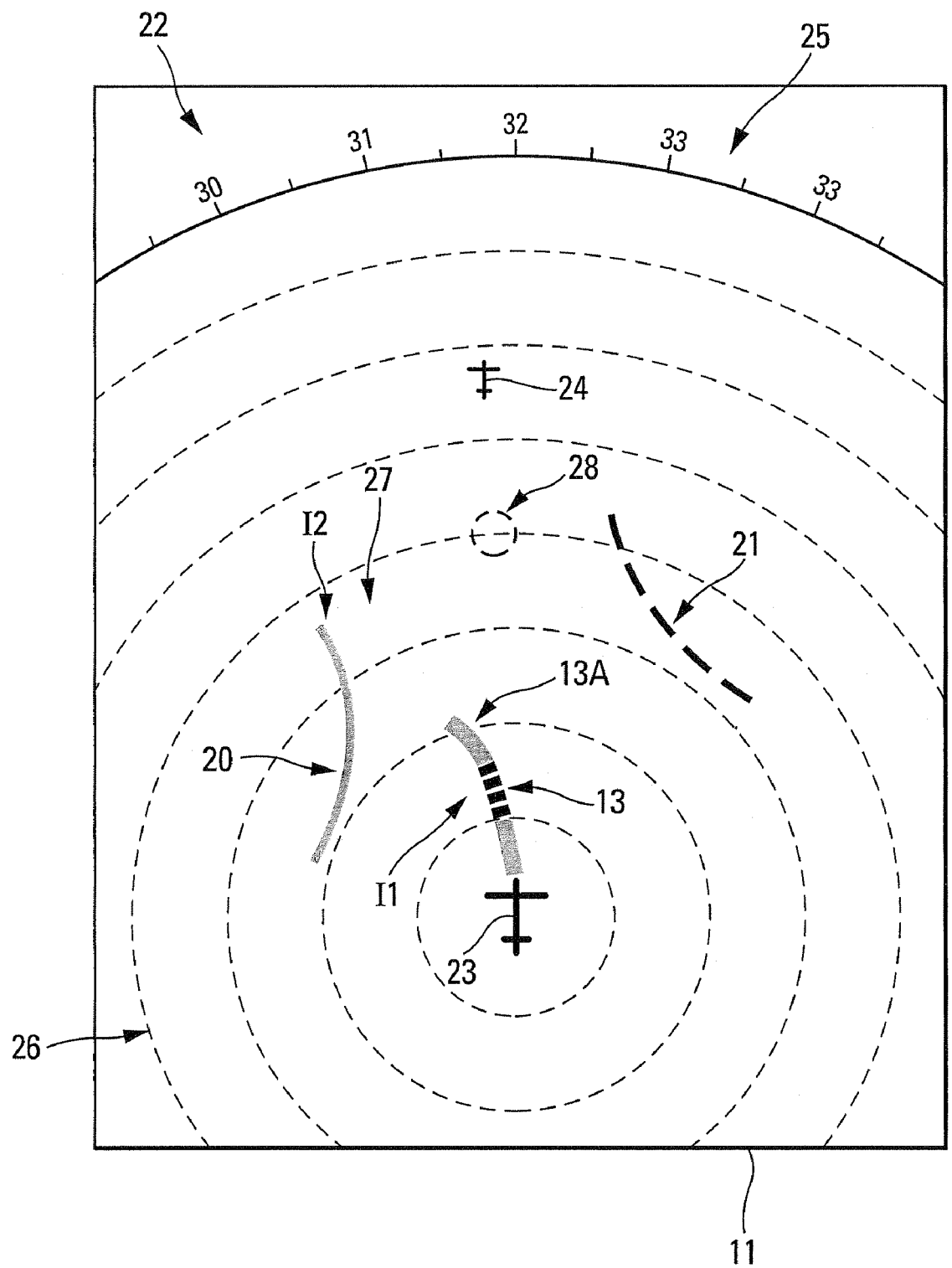
FIG. 3 diagrammatically illustrates a viewing screen of a device in accordance with the invention.

Furthermore, in a second embodiment, as a variant or as a supplement of the first aforesaid embodiment, said flight parameter is the heading. In this case, the indicator I2 preferably comprises curves 20 and 21 which correspond to circular arcs and which form a cone of convergence 27, as represented in FIG. 3. This cone of convergence 27 indicates the limit values of heading, and its colors, which are variable, provide said indication as to compliance.

Of course, in a preferred embodiment, the device 1 in accordance with the invention uses a plurality of different engagement criteria, and the automatic piloting means can be engaged if all the indicators I1, I2 which pertain to these engagement criteria and which are presented on the viewing screen 11 signal a compliance between the corresponding engagement criterion and the associated quantity.

In a preferred embodiment, the screen 11 is a navigation screen, of ND ("Navigation Display") type, which comprises a set of information 22 which corresponds to a standard presentation on a navigation screen and illustrates the situation of the aircraft (lateral flight plan) in a horizontal plane. This set of information 22 comprises in particular, as represented in FIG. 3:
   a symbol 23 illustrating the position of the follower aircraft;
   a symbol 24 illustrating the position of the lead aircraft;
   a graduation 25 in angular deviations; and
   a graduation 26 in distance.

As may be seen in FIG. 3, when the speed vector 13 is not directed towards the interior of the cone of convergence 27, it is either too far left, or too far right. If it is too far left, the means of indication (or curve) 20 situated on the left takes an appropriate color depicting this noncompliance. On the other hand, if the speed vector 13 is too far right, it is the means of indication (or curve) 21 situated on the right which takes this color.

When the speed vector 13 is situated in the cone of convergence 27 and converges to the sought-after position 28 (illustrated for example by a circle) behind the lead aircraft, the two curves 20 and 21 take the appropriate color (green for example) illustrating compliance, and engagement of the automatic pilot is possible (if the engagement condition relating to the speed is also fulfilled).

The speed indicator I1 is superimposed on the speed vector. It represents a speed scale. When the end 13A of this speed vector 13 is colored red, the speed of the follower aircraft is unsuitable for reaching the sought-after position. Conversely, when this end exhibits the color green, the speed of the follower aircraft is correct and allows engagement of the automatic piloting means (in the case where the condition relating to the heading is also fulfilled).

In the example represented in FIG. 3, the automatic piloting means cannot be engaged for the following reasons:
  the speed vector 13 is too high, since the end 13A of this speed vector 13 exhibits the color (red) illustrating noncompliance; and
  the heading is nonconvergent, since the means of indication 20 situated on the left also exhibits this color (red) illustrating noncompliance.

Thus, in this example of FIG. 3, to be able to engage the automatic piloting means, it is necessary for the pilot to bring the follower aircraft to satisfy both the engagement condition relating to the heading and to the engagement condition relating to the speed.

Consequently, without providing guidance information proper, the device 1 in accordance with the invention allows the pilot of the follower aircraft to associate his short-term trajectory with indicators I1, I2, which as a function of their color and/or of their shape and/or of their size, indicate to him whether his tendency is correct for reaching the zone of engagement of the automatic piloting means.

It will be noted that the engagement conditions may depend on the evolution of the trajectory of the ideal position (speed, rectilinear or curvilinear, etc.). The graphical representation implemented by the device 1 in accordance with the invention therefore varies as a function of the conditions of engagement which correspond to this trajectory.

The invention claimed is:

1. A method for assisting a pilot of a follower aircraft which is flying in patrol while following a lead aircraft and which comprises a system for aiding patrol flight comprising an automatic pilot, said method for informing the pilot of the follower aircraft as to a possibility of engagement of said automatic pilot, wherein the following series of successive steps is carried out automatically and iteratively:
  a) devising at least one engagement criterion, which pertains to at least one flight parameter, which depends on the performance of the follower aircraft, and which provides at least one span of admissible values of a quantity;
  b) determining the effective value of said flight parameter on said follower aircraft;
  c) carrying out a comparison by comparing a quantity dependent on the effective value determined in step b) with said engagement criterion;
  d) forming, on the basis of the result of this comparison and of said engagement criterion, at least one indicator which pertains to said flight parameter and which provides an indication as to the compliance of said quantity with said engagement criterion, said indication giving information as to the possibility of engagement of said automatic pilot and if appropriate as to the reason for an impossibility of engagement; and
  e) presenting said indicator, in graphical form, on at least one viewing screen of the follower aircraft.

2. The method as claimed in claim 1, wherein in step a), said engagement criterion is obtained by downloading.

3. The method as claimed in claim 1, wherein in step a), said engagement criterion is obtained by extraction from a database.

4. The method as claimed in claim 1, wherein the quantity used in step c) corresponds to the difference between the effective value of said flight parameter on the follower aircraft and the effective value of said flight parameter on the lead aircraft.

5. The method as claimed in claim 1, wherein said indication as to the compliance is depicted on said indicator presented in graphical form, by at least some of the following characteristics, variable colors; variable shapes; and variable sizes.

6. The method as claimed in claim 1, wherein in step e), textual information indicating the reason for an impossibility of engagement of said automatic pilot is presented on the viewing screen, if appropriate.

7. The method as claimed in claim 1, wherein: the effective value of at least one auxiliary flight parameter of the follower aircraft is determined, having an influence on its performance; and in step a), an engagement criterion is devised, the value of which is dependent on this effective value.

8. The method as claimed in claim 1, wherein said flight parameter is the speed, and said indicator corresponds to a speed vector able to comprise longitudinally at least two different colors, one illustrating a possibility of engagement of the automatic pilot and the other an impossibility of engagement, the color present at the end of this speed vector providing said indication as to compliance.

9. The method as claimed in claim 1, wherein said flight parameter is the heading, and said indicator comprises curves which form a cone of convergence indicating the limit heading values, and whose colors, which are variable, provide said indication as to compliance.

10. The method as claimed in claim 1, wherein said successive steps a) to e) are implemented for a plurality of different engagement criteria, the automatic pilot being engageable if all the indicators presented in step e) signal a compliance between the corresponding engagement criterion and the associated quantity.

11. A device for assisting a pilot of a follower aircraft which is flying in patrol while following a lead aircraft and which comprises a system for aiding patrol flight comprising an automatic pilot, said device for informing the pilot of the follower aircraft as to a possibility of engagement of said automatic pilot, which device is mounted on said follower aircraft and comprises:
  a devising section that devises at least one engagement criterion which pertains to at least one flight parameter, which depends on the performance of the follower aircraft, and which provides at least one span of admissible values of a quantity;
  a determining section that determines, on said follower aircraft, the effective value of said flight parameter;
  a comparator that compares a quantity dependent on said effective value with said engagement criterion; and
  a display:
    that forms, on the basis of the result of this comparison and of said engagement criterion, at least one indicator which pertains to said flight parameter and which provides an indication as to the compliance of said quantity with said engagement criterion, said indication giving information as to the possibility of engagement of said automatic pilot and if appropriate as to the reason for an impossibility of engagement; and
    that presents said indicator, in graphical form, on at least one viewing screen.

12. The device as claimed in claim 11, which comprises, moreover, an actuator that activates/deactivates said device.

13. An aircraft, which comprises a device that implements the method specified under claim 1.

14. An aircraft, which comprises the device specified under claim 11.

* * * * *